(12) United States Patent
Di Rosa et al.

(10) Patent No.: US 7,784,407 B2
(45) Date of Patent: Aug. 31, 2010

(54) ENSILAGE TROLLEY, SHUTTLE AND SYSTEM FOR CONTAINER HANDLING AND STORAGE

(75) Inventors: Gaetano Di Rosa, Pino Torinese (IT); Donato Patrito, Leini (IT)

(73) Assignee: FATA S.p.A., Pianezza TO (IT)

( * ) Notice: Subject to any disclaimer, the term of this patent is extended or adjusted under 35 U.S.C. 154(b) by 223 days.

(21) Appl. No.: 11/822,938

(22) Filed: Jul. 11, 2007

(65) Prior Publication Data

US 2008/0011182 A1    Jan. 17, 2008

(30) Foreign Application Priority Data

Jul. 11, 2006   (IT) .......................... MI2006A1341

(51) Int. Cl.
B60S 13/02   (2006.01)

(52) U.S. Cl. .................... 104/48; 414/279; 414/281

(58) Field of Classification Search ............. 104/48, 104/50, 122, 127, 128, 129; 414/279, 281
See application file for complete search history.

(56) References Cited

U.S. PATENT DOCUMENTS

| | | | | | |
|---|---|---|---|---|---|
| 3,024,037 | A | * | 3/1962 | Fiala ........................... | 280/104 |
| 3,800,963 | A | * | 4/1974 | Holland ....................... | 414/279 |
| 3,817,406 | A | * | 6/1974 | Sawada et al. .............. | 414/279 |
| 3,880,299 | A | * | 4/1975 | Zollinger et al. ............ | 414/273 |
| 4,286,911 | A | * | 9/1981 | Benjamin .................... | 414/273 |
| 4,406,570 | A | * | 9/1983 | Duncan et al. .............. | 414/282 |
| 4,459,078 | A | * | 7/1984 | Chiantella et al. ........... | 414/279 |
| 4,971,508 | A | * | 11/1990 | Miyahara et al. ............ | 414/282 |
| 5,149,240 | A | * | 9/1992 | Di Rosa ...................... | 414/277 |
| 5,330,305 | A | * | 7/1994 | Go ............................... | 414/254 |
| 5,664,929 | A | * | 9/1997 | Esaki et al. ................... | 414/398 |
| 5,833,427 | A | * | 11/1998 | Siegler et al. ................ | 414/277 |
| 5,862,663 | A | * | 1/1999 | Lanza et al. .................. | 60/432 |
| 5,876,172 | A | * | 3/1999 | Di Rosa ...................... | 414/139.9 |
| 5,967,728 | A | * | 10/1999 | Gales et al. .................. | 414/284 |

(Continued)

FOREIGN PATENT DOCUMENTS

EP    0 894 740    7/1998

(Continued)

OTHER PUBLICATIONS

European Search Report dated Apr. 3, 2009.

*Primary Examiner*—S. Joseph Morano
*Assistant Examiner*—Jason C Smith
(74) *Attorney, Agent, or Firm*—Jacobson Holman PLLC

(57) ABSTRACT

A storage system for containers including a plurality of cells for reception of containers and means of transferring containers within and outside of the cells. The transfer means include shuttles for translation between the cells and ensilage trolleys which are carried by the shuttles to face a cell and which are motorized to enter and exit from the cell and transfer containers between the cell and the shuttle. The ensilage trolleys are fitted with at least one transport unit made up of a base frame with motorized wheels for running on rails for the entrance and exit movement and with loading platform arranged above the base frame and designed to support a container. Between the platform and the base frame there are fluid hoisting sets distributed longitudinally to the trolley for controlled hoisting of the platform and which also realize elastic attenuation parts.

18 Claims, 5 Drawing Sheets

U.S. PATENT DOCUMENTS

| | | | | |
|---|---|---|---|---|
| 6,149,366 | A * | 11/2000 | Deandrea | 414/279 |
| 6,234,303 | B1 * | 5/2001 | Gales et al. | 198/817 |
| 6,929,440 | B1 * | 8/2005 | Grond | 414/284 |
| 2001/0008203 | A1 * | 7/2001 | Patrito | 198/836.1 |
| 2001/0042672 | A1 * | 11/2001 | Di Rosa | 198/345.3 |
| 2001/0045341 | A1 * | 11/2001 | Patrito | 198/346.2 |
| 2002/0037208 | A1 * | 3/2002 | Patrito | 414/280 |
| 2006/0045660 | A1 * | 3/2006 | Di Rosa | 414/139.9 |
| 2006/0292018 | A1 * | 12/2006 | Jones | 417/397 |
| 2007/0128005 | A1 * | 6/2007 | Di Rosa | 414/141.3 |
| 2008/0011182 | A1 * | 1/2008 | Di Rosa et al. | 104/96 |
| 2008/0075567 | A1 * | 3/2008 | Di Rosa et al. | 414/266 |

FOREIGN PATENT DOCUMENTS

EP    894740 A1 *   2/1999

\* cited by examiner

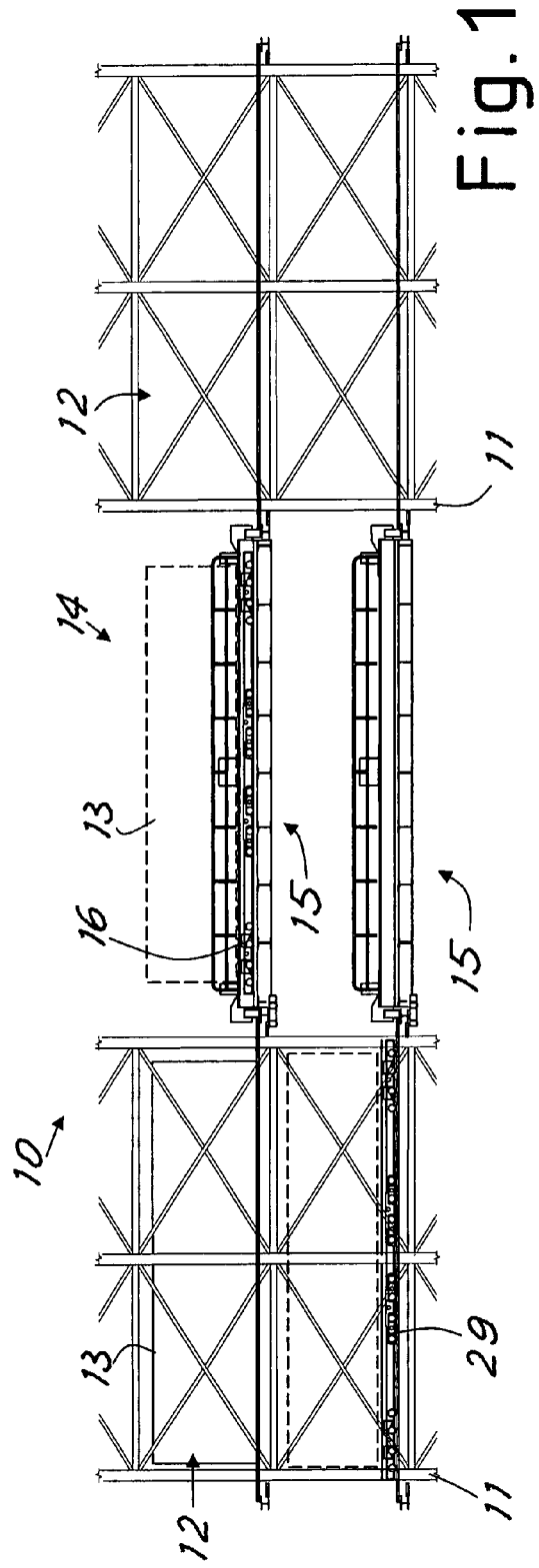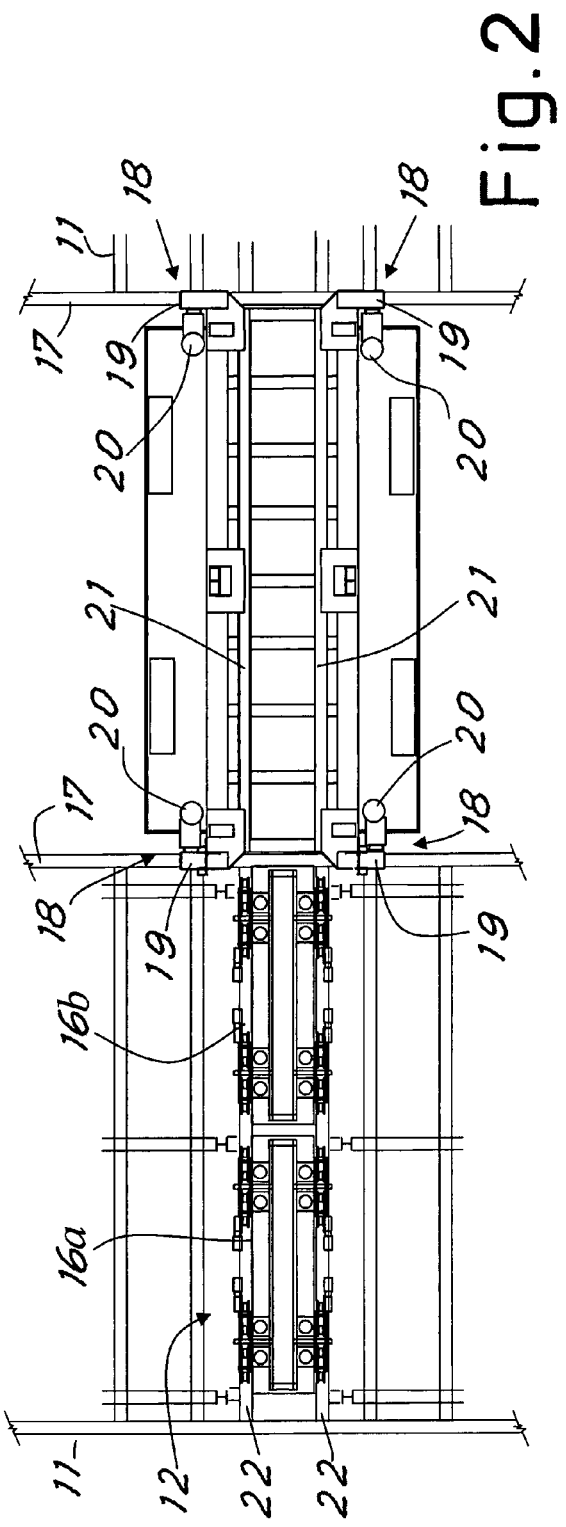

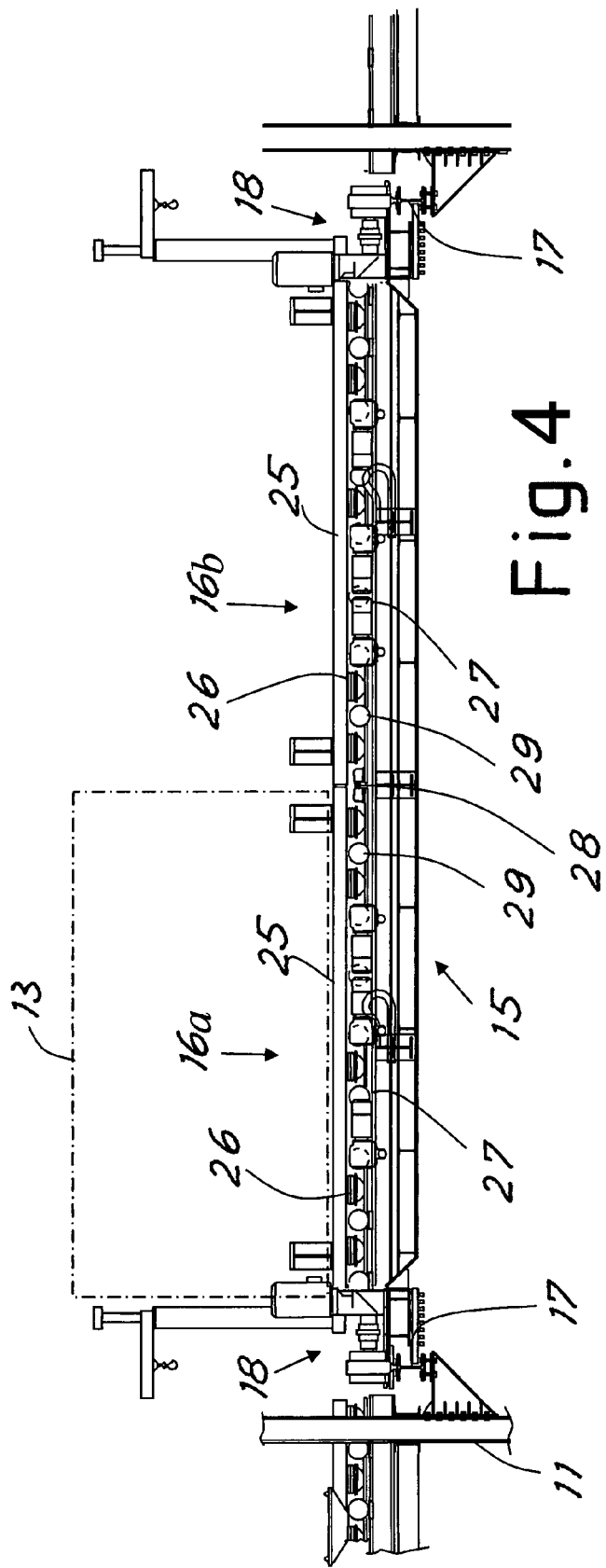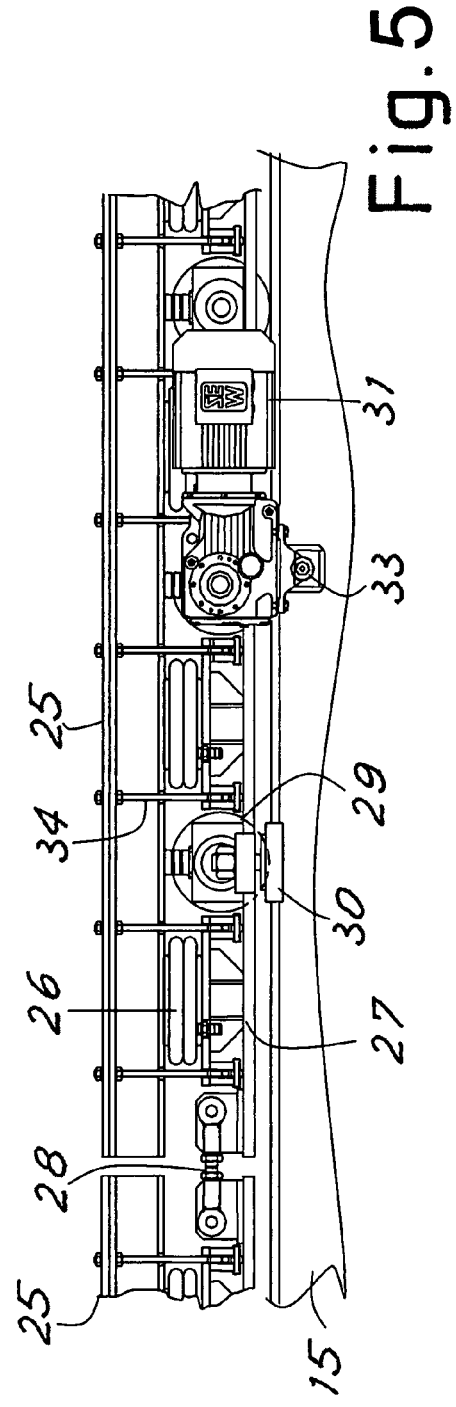

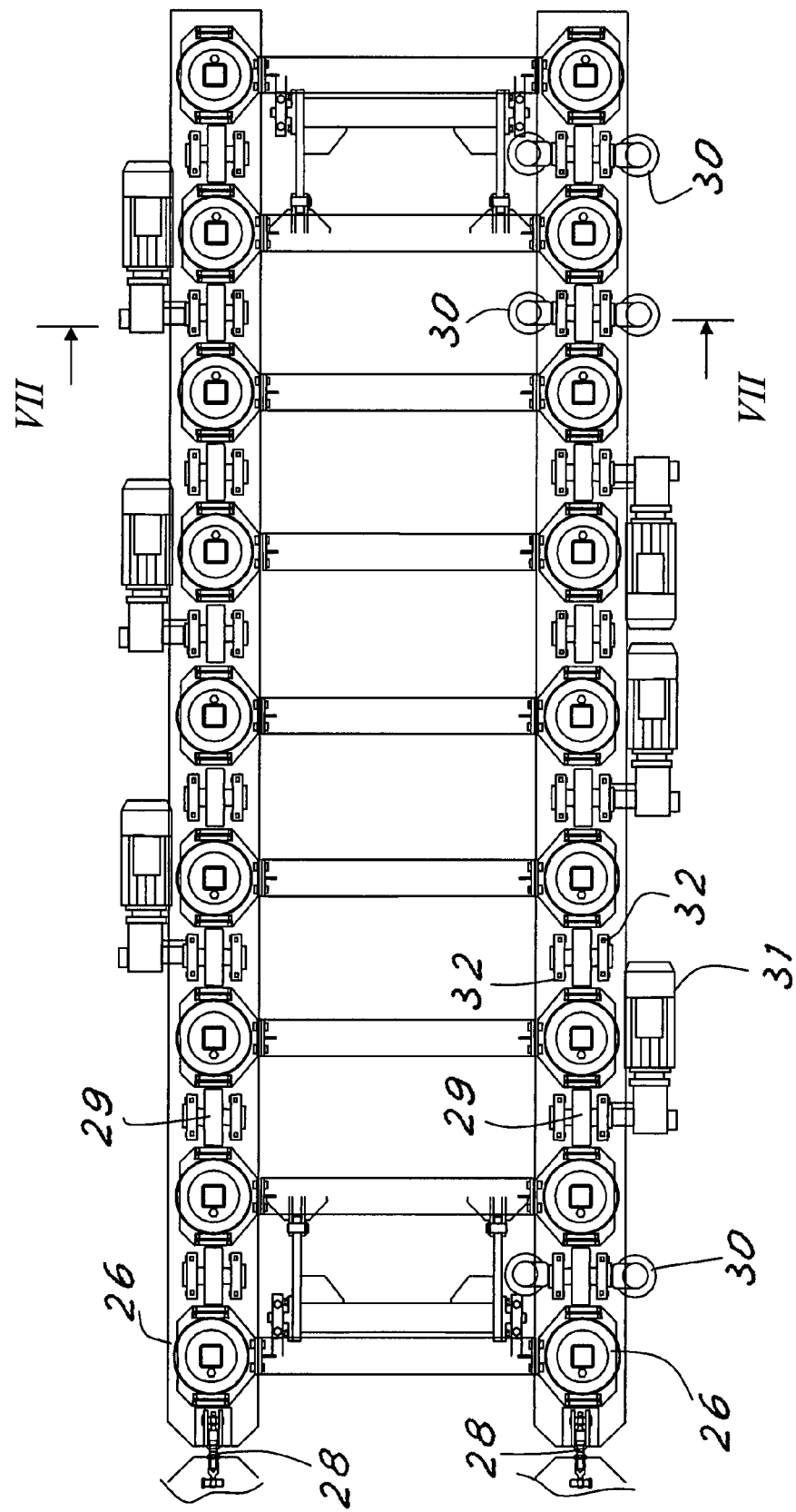

ENSILAGE TROLLEY, SHUTTLE AND SYSTEM FOR CONTAINER HANDLING AND STORAGE

BACKGROUND OF THE INVENTION

1. Field of the Invention

The present invention relates to an innovative ensilage trolley for containers and to a shuttle with said trolley. This invention also relates to a storage system including said shuttle and trolley.

2. State of the Prior Art

The ensilage trolley or ensiler and the shuttle have the function of transferring containers or other assimilable load units (movable cases or equivalent platforms for intermodal transport of various goods) between the different boxes of a warehouse or handling and sorting system of said load units.

In the description below, by the word 'container' is meant all the possible load units assimilable with a container in its various versions.

Usually, warehouses automated with ensilage shuttles and trolleys have boxes arranged on several superimposed levels, normally from 6 to 10 (even if solutions are possible with a larger or smaller number of levels). The boxes are realized with a-structure of columns and cross pieces of steel beams having shelves to support the containers. Among the shelves of boxes there are pathways for the transport system including the trolleys and shuttles.

In the known art of such storage systems, by 'shuttle' is meant a trolley transporting the container in a direction perpendicular to the major axis of the container while the ensilage trolley transports the containers in the direction of the major axis while transferring them with this movement from a storage box to the shuttle and vice versa.

The shuttle transfers the container together with the ensilage trolley, which remains on the shuttle during the movement of same so as to be available for transfer of the container to or from a box when the shuttle is aligned with a new box.

The ensilage trolley disconnected from a trolley is also used for transferring the containers between two aligned boxes belonging to two different sets of shelves facing each other with the short side. In this case the container is transferred from one box of the shelving to the box of the facing shelving instead of from box to shuttle and vice versa. The ensiler moves only forward and backward between the two boxes and transfers the containers while supporting them on itself in the two flow directions.

The bulk of the containers handled can easily exceed 30 tonnes while the length can exceed 12 meters and the width be approximately 2.5 meters with height variable on the basis of the intended use of the container.

The ensiler must therefore be capable of handling containers with rather variable weight and transport them supporting them on itself in different positions. For example, it would be advantageous that the same trolley might support a long or short container transported centered, a short container transported on the right or left side of the ensiler, or two short containers transported simultaneously et cetera.

In addition to the variability of the dimensions, there is also a variability of the position of the center of gravity of the full container depending on the position of the center of gravity of the goods contained in it. A center of gravity position too far from the symmetry axes of the container can cause handling difficulty in the known transport systems.

It is clear that the accidental stopping of a shuttle or an ensilage trolley in the warehouse, in addition to the impossibility of taking or depositing the container foreseen, has repercussions of varying gravity on the entire system based on the type and position of the failure. The difficulties of acceding to a failed machine together with the mass and dimensions of the loads transported increase the difficulties of solving a failure situation.

From the foregoing the need is clear for realizing machines as simple as possible with high reliability, easy to repair even outside the area equipped for programmed maintenance and calling for minimum maintenance even if used in a marine environment. In addition, it is preferable that these machine be capable of completing the work cycle started in the greater part of failure cases foreseen. The whole set remains in minimal dimensions of space occupied in height and reasonable costs.

The general purpose of the present invention is to remedy the above mentioned shortcomings of known devices and make available an innovative ensilage trolley for containers, a shuttle with said trolley and a storage system including said shuttle and trolley which allow satisfaction of the requirements mentioned.

SUMMARY OF THE INVENTION

In view of this purpose it was sought to provide in accordance with the present invention a motorized ensilage trolley for entering and exiting from a cell in a container storage system and transfer containers between the cell and the exterior and characterized in that the trolley is equipped with at least one transport unit made up of a base frame with motorized wheels for running on rails for movement of entry and exit of a loading platform arranged over the base frame and designed to support a container with there being between the loading platform and the base frame fluid hoisting sets distributed longitudinally to the trolley for controlled hoisting of the platform and which also realize elastic attenuation parts.

Again in accordance with this invention it is sought to realize a shuttle for translation between cells in a container storage system including on it such a trolley.

It is also sought to realize in accordance with this invention a container storage system including a plurality of cells for reception of containers and means of transfer of containers inside and outside of the cells with the transfer means including such a shuttle for translation between the cells and such an ensilage trolley carried on the shuttle to face the cells.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings:

FIG. 1 shows a diagrammatic side elevation view of a storage system part with shuttle realized in accordance with this invention, FIG. 2 shows a diagrammatic plan view of a shuttle of FIG. 1 with an ensilage trolley advanced in a cell of the warehouse, FIG. 4 shows a diagrammatic side view enlarged by one shuttle in accordance with this invention, FIG. 5 shows an enlarged diagrammatic view of a detail of a motorization zone of the shuttle of FIG. 4, FIG. 6 shows a diagrammatic plan view of an ensilage trolley part of the shuttle of FIG. 4.

DETAILED DESCRIPTION OF THE INVENTION

Figure 3:
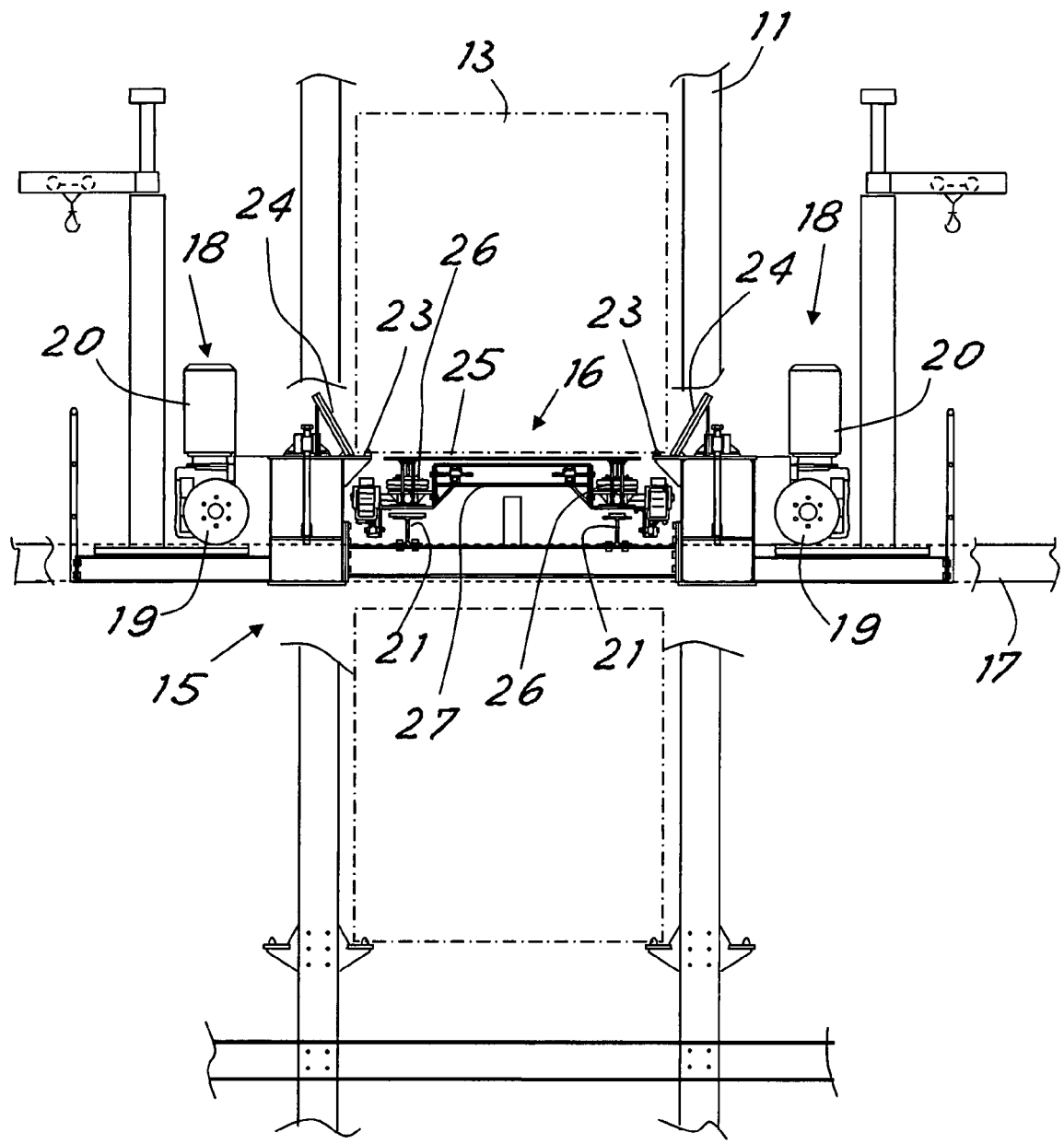
FIG. 3 shows a diagrammatic view taken transversely to the axis of a shuttle.

With reference to the figures, FIG. 1 shows part of a warehouse system designated as a whole by reference number 10 and realized in accordance with this invention.

The system includes a reticular structure or shelving 11 which identifies cells or boxes 12 for housing of containers 13 and corridors 14 between walls of facing cells which define horizontal lanes in which run motorized shuttles 15 for transport, insertion or extraction of the containers. The warehouse can include at the ends of each corridor lifting means for vertical translation of the containers. A similar warehousing structure is well known to the technician and not further described nor shown.

To introduce containers into and extract them from the cells there are ensilers 16 each transported by a shuttle 15 along the lane so as to align it with the boxes 12. FIG. 1 shows diagrammatically a shuttle with ensiler withdrawn aboard (upper shuttle) and a shuttle with ensiler inserted in a cell (lower shuttle). The shuttle with ensiler off board and inserted in the cell is also shown in plan view in FIG. 2.

As see well in FIG. 2 also, the shuttles run horizontally among the cells along tracks 17 by means of motorized units 18 each one including a wheel 19 and an electric motor reducer 20.

The shuttle has a pair of tracks 21 which are aligned with corresponding tracks 22 in each cell and on which run the ensiler 16 by means of a plurality of partially motorized wheels 29 to enter into and exit from the cells of the shelves. As clarified below, the ensiler has a platform which moves vertically for hoisting of the containers from special supports in the cells and aboard the shuttles.

The ensiler can therefore exit from the shuttle, to enter in a cell sliding on the pathway constituted from tracks 21, 22, introducing itself under the container in the cell, to raise the container, releasing it from the supports, to return aboard the shuttle transporting the container and, at last, to put down the container on the appropriate supports aboard the shuttle.

The container transfer cycle from the box to the shuttle being completed the shuttle can be moved opposite an empty box where, by performing the cycle symmetrical to that described above, it deposits the container on its supports of the new box. The box can also contain a vertical lift for the container.

The ensiler, in passing from the shuttle to the box, must overcome a break in the pathway deriving from the play necessary between the fixed pathway in the boxes and the movable one on board the shuttle. The play must be sufficiently ample to compensate for the relative movements due to thermal variations, to movements of the shelves, to take-up of play et cetera. In addition, at the end of the pathway beyond the empty space there is also a misalignment on the vertical plane given by the different elastic camber of the two structures in the different load conditions.

As may be seen in FIG. 3, the shuttle structure includes shelves 23 to support the container for transportation and among which is arranged the ensiler 16. Inclined guide and centering floors 24 cooperate advantageously with the shelves.

The ensiler 16 has the upper loading platform 25 which is supported by means of hoisting sets 26 on the underlying motorized structure 27 which runs along the tracks 21. The hoisting sets are distributed along the frame and are advantageously realized by means of pneumatic cylinders with bellows.

Advantageously, the upper movable loading platform is a rigid structure while the base frame is made up of a particularly simple elastic structure which supports the wheels and, having the possibility of deforming in elastic field, inflectionally and torsionally, it adapts to all the irregularities of the pathways and in this manner allows all the wheels to remain in contact therewith without the use of the large quantity of precision balances and articulated arms which would be necessary to allow adaptation to the pathway of the considerable number of wheels which support the load.

As seen well in FIG. 4, advantageously the ensiler is made up of two equal units 16a, 16b connected in series. As seen in the figure, the two units can collaborate for the transportation of long containers (FIG. 1) or a single unit can support a half-length container (FIG. 4).

As seen again in FIG. 4 and, more in particular, FIG. 5, the two load units 16a and 16b are connected together by a pair of connecting rods 28. The two load units making up the ensilage trolley are connected together this way by a coupling allowing a minimum adaptation to the irregularities of the pathway and at the same time constrain rigidly the two units to follow the same acceleration-deceleration law, hence in the translation movement they behave as a single vehicle with twelve motors (six per unit).

FIGS. 4 and 5 show in greater detail for each unit the upper loading platform 25 movable vertically, the base frame 27 supporting the bearing wheels 29 and the bellows cylinders 26 which in expanding control the hoisting of the upper movable load unit. The tie rods 34 for limiting the hoisting path are also visible.

In FIG. 5 it is noted how the upper loading platform is realized by means of longitudinal beams which assure rigidity to the loading platform while the base frame part is realized relatively thin to allow the above mentioned elastic flexibility. In this manner the wheels 29 constrained directly to the base frame are kept correctly gripped on the running tracks with no need for other devices. Elimination of the precision balances used generally in the prior art, in addition to the obvious reduction of construction and assembly costs, has a considerable advantage from the operative viewpoint due to elimination of parts (pins, bushings, arms) which require a constant accurate maintenance and the greater simplicity of the machine which consequently reduces the chance of failure.

FIG. 5 also shows wheels 30 with vertical axis for lateral guidance of the ensiler along the tracks. As shown better in the plan view of FIG. 6 (only one unit of the ensiler is shown for simplicity) and in FIG. 7 the side guidance wheels 30 are arranged in pairs to be supported on two opposite side edges of a single rail of the pair of ensiler running rails. Advantageously, each load unit is guided by three pairs of guide wheels. The first two pairs are near one end of the two units making up the ensiler and the other pair is near the other end, which is the one facing the other unit. In this manner, the complete ensiler will have two pairs of wheels at one end, two pairs in the middle (one pair per unit) and two pairs at the other end.

The arrangement of the wheels described above allows, with the use of a lower number of guide wheels, crossing of breaks in the pathway without losing the guidance effect because at every moment at least one pair of wheels at each end of each load unit remains gripped on the pathway and in addition, the guide performed acting on the two sides of only one of the two pathways allows accurate guidance of the ensiler trolley conditioned only by the construction tolerance on the width of the pathway and independent of the position errors, parallelism, rectilinearity of the totality of the two pathways.

Each unit has a good number of supporting wheels 29 of small diameter (for example sixteen wheels) for the purpose of limiting the space occupied in height and distributing the load uniformly over all the entire length of the pathway while reducing the flexion stress and making possible the use of lighter and hence more economical profiles, limiting the specific pressure on the pathway, allowing crossing of the irregularity of the pathway with a limited increase in the load on the wheels which remain supported and must carry the load while a pair of wheels is transiting on the break of the pathway and consequently is totally unloaded.

Again in FIG. 6 shows the alternating and uniform distribution of supporting wheels 29 and for pneumatic hoisters 26 which was found particularly advantageous. Advantageously, the motor reducers 31 for handling of the wheels are arranged alternatively on the right and left of the trolley and are fitted directly on the shaft of the respective wheel without intermediate transmissions. This together with assembly of the wheel on bearings with watertight rings arranged so as to create an increased reserve of lubricant compared with the normal sealed bearings make practically null the need for maintenance of this whole set with consequent advantages in terms of cost and reliability of the system. The wheels are all identical except for the axle which in the drive wheels is lengthened so that it can couple with the motor reducer so that it is possible to vary the number of drive wheels simply by installing a drive wheel set in place of an idling wheel set.

Figure 7:
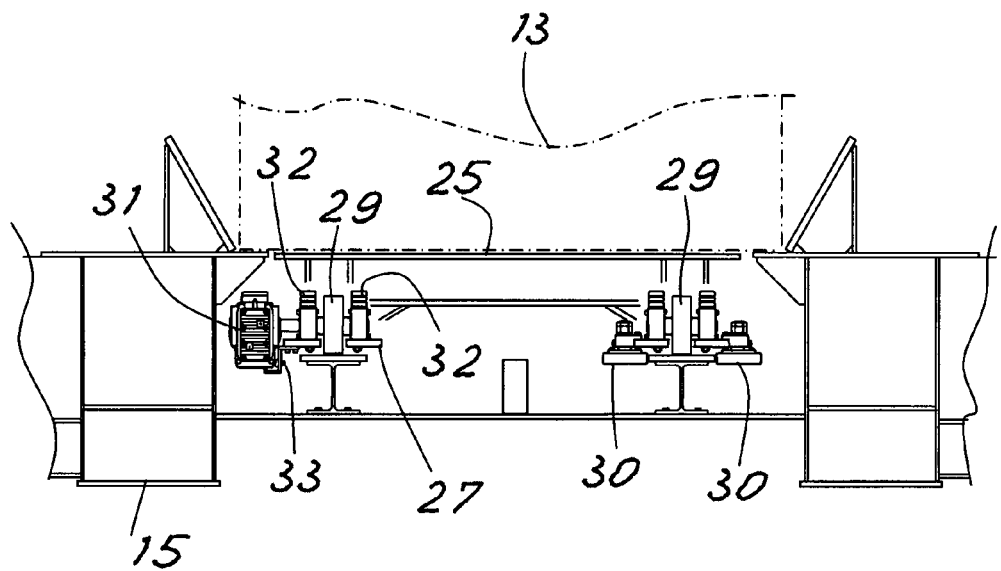
FIG. 7 shows a diagrammatic view along line VII-VII of FIG. 6 of the ensilage trolley on the respective shuttle.

To allow rapid replacement of the complete idling wheel unit the supports of the roller bearings which support the axle of the wheels can be disassembled upward by unscrewing only four bolts 32 or the complete drive wheel by unscrewing the same four bolts plus a bolt 33 which holds the reaction arm (as shown also in FIG. 7).

Again advantageously, the drive wheels on the right-hand side and the left-hand side are not arranged on the same axle but are out of phase by one step (where to the right the drive wheel is driving and to the left it is idling and vice versa). This way, a single drive wheel at a time can be at the irregularity of the pathway so that even in this small section of the path the traction is always assured by eleven drive wheels out of twelve.

Advantageously, between the upper movable loading platform and the base frame there are interposed a high number (eighteen) of pneumatic cylinders with bellows arranged on the same longitudinal axle and alternating with the bearing wheels which can thus perform different functions. Advantageously, the movable frame hoisting means of each unit are controlled independently of those of the other so as to be able to take or deposit independently only one of two short containers (for example 20') which can be stored in a box of 40'. When one takes or deposits the 40' container, both the hoists are operated simultaneously.

In addition to the above mentioned function of hoisting and lowering the upper loading platform and the container, they allow uniform sharing of the load among all the wheels coupled with a bellows set with common powering and allow determining the weight of the container transported and the plan position of its center of gravity and lastly carry out the function of softly amortizing all the jolts and vibrations and the concentrations of stresses which there are with the movement of means in particular when the masses transported are considerable.

When the two units are not loaded in the same manner or at the limit one is loaded and the other not loaded, the vertical load on the drive wheels of the unit with lightest load is the one which determines most transmissible horizontal force from each of the wheels of the ensiler to avoid its slipping in every load condition.

Considering that the load transported by each load unit can reach even five times the weight of the empty vehicle, it is clear how penalizing the acceleration limitation is which is obtained by limiting the torque to that defined for accelerating the empty vehicle even when the vehicle is fully loaded with resulting lengthening of the cycle time.

It is not enough to take with a sensor the presence of a container on board the ensiler to be able to vary consequently the torque delivered by the motor because the content of containers is extremely variable and, consequently, even their weight has considerable variations so that using a mean value one risks slipping when the weight is low and does not utilize all the acceleration possibilities when the weight is high.

In the subject ensiler one manages to obtain maximum possible acceleration compatibly with the number of driving wheels and with the present friction coefficient between wheels and the pathway by varying the torque of the motors as a function of the load effectively on the driving wheels. The torque is equal between the motors of a unit and can be different from that of the motors of the other unit if the latter is subjected to a different load (for example a heavy container on one unit and no load transported on the other unit).

Thanks to the pneumatic suspension of the cylinders 26 the load transported is shared equally between all of the bearing wheels (drive and idling) of a unit.

Figure 8:
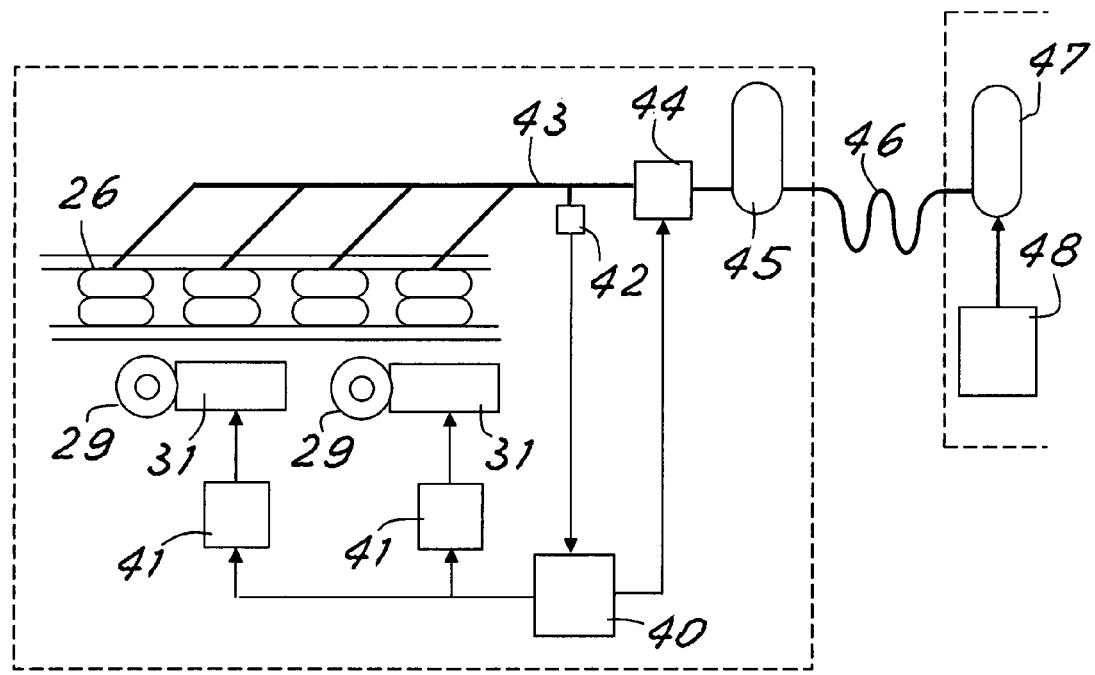
FIG. 8 shows a diagrammatic view of a control part of the ensilage trolley.

As shown diagrammatically in FIG. 8, an electronic control unit 40 manages the trolley functions. In particular the control unit 40 controls electronic operations (inverter) 41 of the motor reducers so as to regulate the torque delivered by the motors as a function of a signal proportionate to the pressure generated by a pressure transducer 42 located on the pneumatic hoisting system 43. The system controls the pressure so as to balance the load transported. The electrical motor-control equipment is located advantageously on board a shuttle to be easily accessible and commutable on those of backup.

The movement of hoisting and lowering the movable frame of the ensiler is controlled by the bellows cylinder 26 through a battery of electromagnetic valves 44 motorized by a reserve of compressed air contained in one or more tanks 45 transported by the ensiler trolley which are motorized through flexible tubes 46 connected to a main tank 47 arranged on board the shuttle. The pneumatic powering of the ensiler by the shuttle can be realized with a double flexible tube to be able to continue working even in case of breakage of one of the tubes. The air reserve on board the ensiler is advantageously such as to be able to carry out at least one hoisting cycle even under powering interruption conditions by the shuttle.

Under normal operating conditions a small compressor 48 on the shuttle provides refilling of the main tank and the tanks on board the ensiler. The energy necessary for fast hoisting of the movable frame with the container loaded is accumulated in the tanks by utilizing little power for a long time and is available for hoisting the container rapidly without having to install a large power supply which would then be used for a few seconds each cycle. Advantageously, the pneumatic circuit can include safety valves which automatically exclude a failed bellows cylinder and allow continuing work with those remaining.

The hoisting run necessary for releasing the container from the benchmarks in the boxes and on the shuttle is much smaller than that necessary for conventional container handling means (straddle carrier, reach stacker) so that movement for setting down and picking up can be done using low speed even though making the movement in reduced time. As a result the acceleration or shock to which the containers and goods contained therein are subject are considerably reduced and are still more reduced by the mildness of movement of the pneumatic hoisting system.

With this control system the driving torque is regulated as a function of the load transported by each single unit allowing the best utilization of the acceleration and deceleration possibilities of the ensiler as a whole set. Either the electrical or pneumatic connections between the shuttle and the ensiler can be made by means of quick plugs and connectors to be able to disconnect the ensiler fast from its shuttle so as to be able to perform replacements and repairs rapidly.

It is now clear that the preset purposes have been achieved. The particular structure of the ensiler trolley allows high reliability even with reduced maintenance. The system also allows reliable and safe management of containers having different dimensions, weights and centers of gravity. The pneumatic hoisting system allows uniform distribution of the load on all wheels and reduced flexion stress on the pathway and the specific contact pressure. The amortized support of the container also allows reduction of vibrations to which the container content is subject, reduction of the stress peaks transmitted to the support structure and to the machines cooperating with the ensiler.

In addition, thanks to the innovative structure it is possible to rapidly replace a failed ensiler with an efficient one in the maintenance zone. In addition, it is possible to temporarily deposit an ensiler in the maintenance zone and use the shuttle for other functions such as going and picking up an ensiler doing service in the so-called 'movable box' and transport it to the overhaul zone for programmed maintenance or for repairs which it is not economical to perform locally. It is also possible to abandon a broken down ensiler which can no longer move in the same box where it broke down so as to free the shuttle and consequently the corridor to rapidly resume activity with a reserve shuttle. The shuttle without ensiler can be equipped with a new ensiler in the maintenance zone or wait in the same zone until its ensiler is repaired.

With the structure in accordance with this invention the possibility that an ensiler will undergo a failure preventing it from reaching the maintenance zone is extremely reduced. For example, in case of failure of a motor the remaining eleven allow completing the work cycle. In case of failure of a wheel the other fifteen on which in the worst case the load is distributed allow translation of the ensiler. If the wheel is then completely blocked and it is wanted to avoid its dragging on the pathway, it is possible to raise it slightly from the pathway by acting on the tie rods which limit the hoisting run.

The motors can be equipped with manual unlocking of the brake to allow opening of the brakes even in case of failed electric power.

As can be seen in the figures, the structure of the trolley makes it possible to carry out repairs even on an ensiler blocked in a box with a container on board since all the critical mechanical parts (motors, wheels, bellows cylinders, electromagnetic valves) are accessible and replaceable from beneath the ensiler. A special movable maintenance platform can be positioned where necessary using a shuttle.

In the same manner the shuttle is provided with all the characteristics necessary to make extremely unlikely the possibility that it might stop during a working cycle. For example the motorization is independent on all the four wheels with the possibility of completing the cycle at reduced speed with only two motors on service.

Thanks to the compressed-air hoisting system, in case of failure of the compressor or the connecting tubes the hoisting system can be supplied by means of a rapid connection to be connected by means of a flexible emergency tube to the tank of a shuttle different from the one on which the ensiler is normally dependent. It is also possible to use the compressed air contained in a normal breathing apparatus cylinder to control the hoisting in case a second shuttle from which to take the compressed air is not quickly available.

Naturally the above description of an embodiment applying the innovative principles of the present invention is given by way of non-limiting example of said principles within the scope of the exclusive right claimed here. For example, without leaving the ambit of this invention the pneumatic circuit can be realized with several separate circuits for reasons of safety with the use of leveling valves for control of the position of the container and with position and multiple pressure transducers, encoders on the drive and idling wheels and calculation algorithms of the torque to be delivered as a function of the information received.

By using several pressure sensors each connected to a separate circuit separately feeding groups of pneumatic bellows cylinders it is possible to determine the weight distribution both longitudinally and transversely and in addition to using this information for management of the distribution of the torque among the various motors it is possible to calculate the position of the center of gravity and, if the container risks instability, automatically reduce speed and acceleration for that particular mission. The sensors, circuits and cylinder units can be advantageously four. It is also possible to memorize this information and combine it with the data of that container to signal it at the time of loading on the train, truck or ship so that the appropriate precautions are taken during maneuvering. Movement of the load in the container due to incorrect arrangement of the goods contained and to the dynamic stresses to which it is subjected during the trip is not infrequent and can become a source of accidents if not detected and, in the most serious cases, it is necessary to open the container and proceed with reloading the contents thereof.

The number of bellows-type pneumatic cylinders, the number of bearing wheels, the distribution among idling and motorized wheels are not binding and can be generously changed to enhance one or the other characteristic of the system described in one of the various possible configurations without leaving the scope of the invention. The pneumatic system can be realized also as hydro-pneumatic or hydraulic with tanks. The movements of ensiler shuttle and trolleys can be oriented along other axes of the container. The warehouse can have a different number of levels even on a single non-reticulate floor and structure.

What is claimed is:

1. A motorized ensilage trolley for entering and exiting from a cell in a storage system of containers and for transferring containers between the cell and an area outside the cell, the trolley comprising
　　at least one transportation unit made up of a base frame with motorized wheels for running on rails for entry and exit movement and a loading platform arranged over the base frame and designed to support a container, and
　　a plurality of individually controlled pneumatic hoisting actuators distributed longitudinally between the loading platform and the base frame, the pneumatic hoisting actuators being distributed longitudinally along the frame for controlled hoisting and lowering of the loading platform towards and away from the frame and said pneumatic hoisting actuators forming elastic cushioning elements for balancing a load of a container placed on the loading platform said pneumatic hoisting acuators being arranged alternating with running wheels of the trolley.

2. The trolley in accordance with claim 1, wherein the pneumatic hoisting actuators have pneumatic cylinders with bellows.

3. The trolley in accordance with claim 1, wherein the pneumatic hoisting actuators are motorized by air tanks on board the ensiler trolley.

4. The trolley in accordance with claim 1, wherein the pneumatic hoisting actuators are distributed along the two side edges of the trolley.

5. The trolley in accordance with claim 1, wherein the pneumatic hoisting actuators are arranged aligned with the trolley running wheels in the longitudinal direction of the trolley.

6. The trolley in accordance with claim 1, wherein the wheels are rigidly supported on the base frame and the base frame is flexible so as to allow uniform support of the wheels.

7. The trolley in accordance with claim 1, further comprising two transport units aligned longitudinally and mutually constrained and with an independent loading platform.

8. The trolley in accordance with claim 7, wherein the two units act with independent hoisting to each handle a short container or act with coordinated hoisting to handle a longer container together.

9. The trolley in accordance with claim 1, wherein the wheels are arranged in a plurality, alternately motorized and idling.

10. The trolley in accordance with claim 9, wherein the motorized and idling wheels on the two sides of the trolley are arranged out of phase to have each idling wheel aligned with a motorized opposite wheel.

11. The trolley in accordance with claim 10, wherein each motorized wheel is connected to a corresponding motor reducer.

12. The trolley in accordance with claim 11, wherein the motor reducers are controlled by a control unit which guides the pair of motors as a function of a pressure signal detected by a pressure sensor connected to the hoisting actuators.

13. The trolley in accordance with claim 1, wherein the hoisting actuators are grouped in a set to be motorized and with a respective pressure sensor to govern power torque of wheel motors associated with the set so as to independently conform the power torque to a load on each set.

14. The trolley in accordance with claim 1, further comprising control means for detecting a vertical load on the hoisting actuators and for determining a plan position of a center of gravity of a transported load.

15. A shuttle for translation between cells in a container storage system and including the ensiler trolley in accordance with claim 1.

16. The shuttle in accordance with claim 15, wherein the hoisting actuators are motorized by air tanks aboard the ensiler trolley and the tanks aboard the trolley are refilled by air supply on board the shuttle.

17. The shuttle in accordance with claim 15, further comprising independently motorized handling wheels for movement along the cells of a warehouse.

18. A container warehouse system including a plurality of cells for receiving containers and container transfer means into and out of the cells with the transfer means including shuttles for translation between cells and ensiler trolleys which are carried by the shuttle to face a cell and which are motorized for entering and exiting from the cell and transfer containers between the cell and the shuttle and the trolleys are in accordance with claim 1.

* * * * *